United States Patent

Hoog

[11] 4,005,600
[45] Feb. 1, 1977

[54] APPARATUS FOR MEASURING THE RELEASE FORCE OF SAFETY SKI BINDINGS

[75] Inventor: Sivert Hoog, Nassjo, Sweden

[73] Assignee: Aktiebolaget Elof Malmberg, Gavle, Sweden

[22] Filed: Apr. 25, 1975

[21] Appl. No.: 571,519

[30] Foreign Application Priority Data

May 6, 1974  Sweden .............................. 7405974

[52] U.S. Cl. ............................. 73/133 A; 33/174 D
[51] Int. Cl.² ......................................... G01L 5/03
[58] Field of Search ................ 73/133 A; 33/174 D

[56] References Cited
UNITED STATES PATENTS

| 3,309,919 | 3/1967 | Lipe et al. | 73/133 A |
| 3,739,631 | 6/1973 | Clifford | 73/133 A |

Primary Examiner—Charles A. Ruehl
Attorney, Agent, or Firm—Hubbell, Cohen, Stiefel & Gross

[57] ABSTRACT

A test apparatus for measuring the force which is required for releasing a ski binding of the safety type comprises a forked lever provided with at least one projection which defines a pivot axis for the lever. The lever comprises two articulated shanks, the free ends of which have measuring projections for measuring the transverse dimension of the shin-bone head.

11 Claims, 5 Drawing Figures

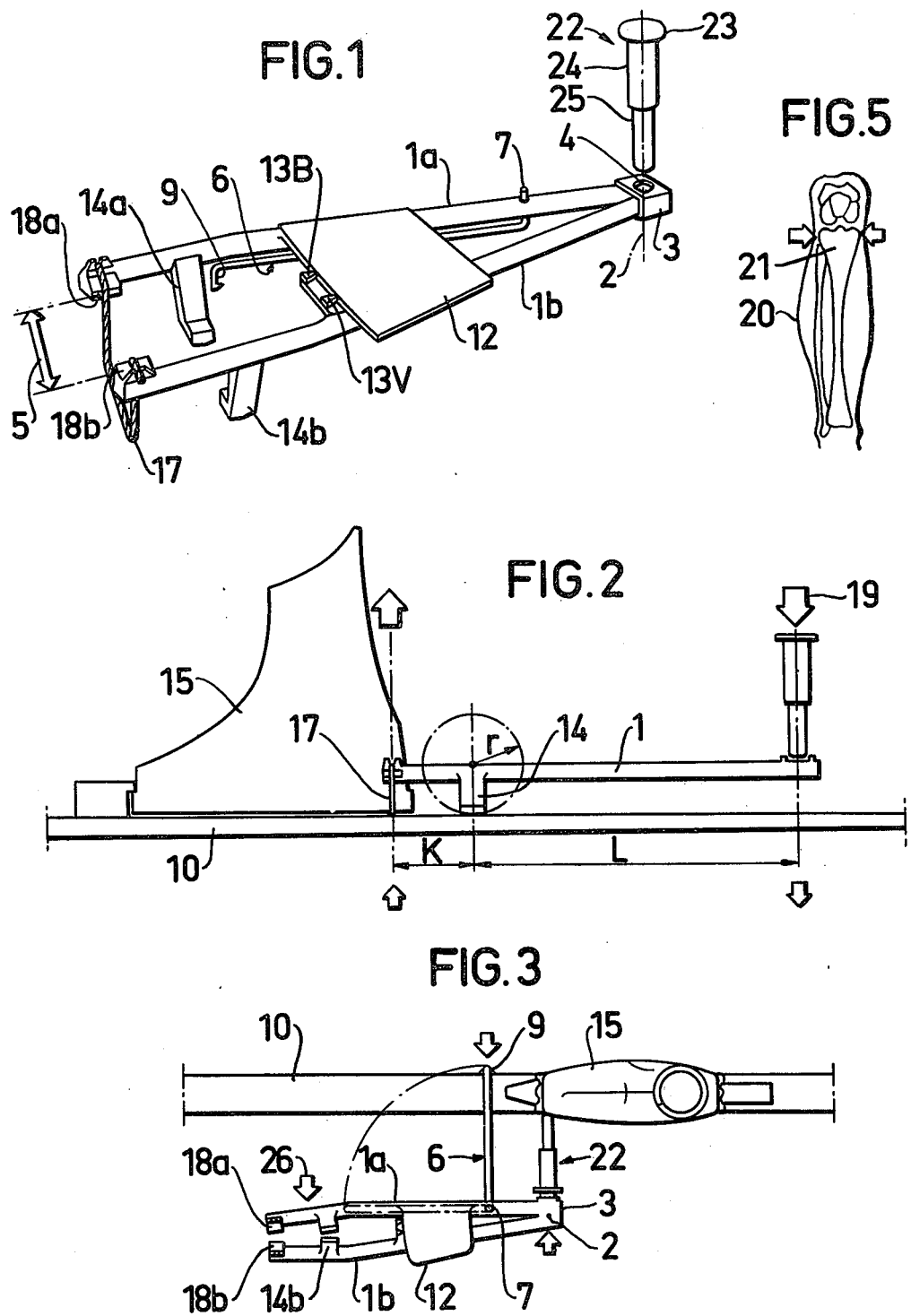

APPARATUS FOR MEASURING THE RELEASE FORCE OF SAFETY SKI BINDINGS

This invention relates to an apparatus for measuring the force required for releasing the heel and/or toe fastening means of a ski binding of the safety type, comprising firstly a preferably two-armed lever having at least one pressure taking up support face for a force measuring tool associated with said measuring apparatus and having two shanks which project from a common point on the lever and the free ends of which are interconnected by a wire, a band or the like, which extends across the ski, under the heel portion of a ski boot fastened in said ski binding when said measuring apparatus is used for disengaging said heel portion from an associated heel fastening means of said ski binding through the lifting of said heel portion, and secondly at least one abutment or the like which projects from the lever, is adapted to be applied against the ski and defines a pivot axis, on which the lever is pivotable for disengaging the ski boot at least from the heel fastening means.

Security or release ski bindings of the kind referred to are designed in such a manner that the skier's boot fastened therein is freed or released when it is actuated by sufficiently great forces, which tend to lift the heel and/or the toe or twist the toe and/or the heel. These forces usually occur individually or in different combinations when the skier falls. The majority of the release bindings now in use have automaticity only for turning of the toe laterally and release of the heel upwards, but demands have been made by doctors and others for increased use of release bindings with "full automaticity", which means that it shall be possible to free the toe upwards and twist out the heel laterally, too.

To make the safety bindings used in downhill skiing, such as slalom, work in the appropriate way and thus prevent injuries to the skiers, it is necessary to adjust the bindings in such a way that the force which is required for releasing them (the release force) is no greater than the maximum force to which the skier should be subjected (i.e. which his leg can stand). In view hereof measuring apparatus or machines have been constructed, by means of which the setting and the function of release ski bindings can be tested. The few types of measuring apparatus which are available are characterized by being designed in such a way that it is necessary initially to fasten the ski in the apparatus and to carry out the test on the boot only (no foot inserted therein), particularly when lifting is concerned. The drawbacks of known devices of this kind are numerous. On the one hand, the machines, which usually are operated hydraulically, are complex and expensive; on the other hand they can not be used out in a slalom or downhill slope for testing a binding while a skier wears the boot fastened in the binding on his foot.

The principal object of the invention is to eliminate the above drawbacks and to provide a simple, cheap, manually operated test or measuring apparatus, which can be used even out-doors, e.g. in slalom slopes, without the necessity of taking the foot out of the ski boot.

This and other objects are attained by the measuring apparatus according to the invention thanks to the fact that the two shanks of the lever are turnable in relation to each other on an axis which is distinct from the pivot axis on which the lever is pivotable when disengaging the heel portion of the ski boot by lifting it out of said heel fastening means of the ski binding.

It has been found that a close correlation exists between the release force and certain dimensions of the human body, particularly the width of the shin-bone, measured parallel to the rotational axis of the knee joint. In a preferred embodiment of the invention the measuring apparatus is therefore provided with a scale and so designed as to permit the measuring of this dimension.

Further features and advantages of the measuring apparatus according to the invention will become apparent from the following detailed description and the annexed drawings, which diagrammatically and as non-limiting examples illustrate an embodiment of the invention preferred for the present.

In the drawings;

FIG. 1 is a perspective view of the measuring apparatus according to the invention, together with its associated force measuring means;

FIG. 2 is a side elevation utilization of the measuring apparatus for determining the release force ($U_H$) when lifting the heel portion of a ski boot out of a heel clamping means;

FIG. 3 is a plan view of the measuring means for determining the release force ($U_T$) when twisting the toe portion of a ski boot out of a toe clamping means;

FIG. 5 diagrammatically illustrates the measuring of the lateral dimension of the shin-bone.

Figure 4:
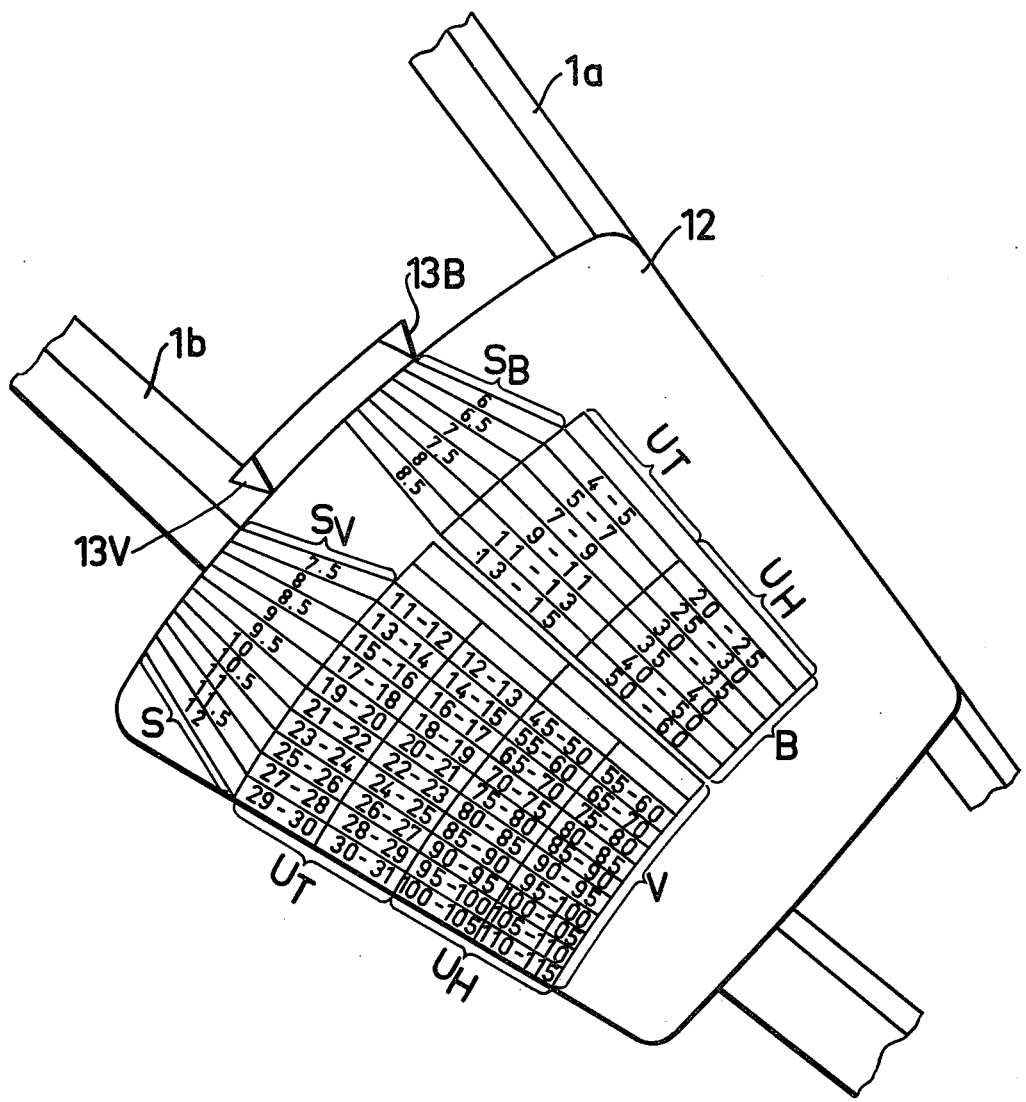
FIG. 4 is a plan view illustrating a scale and a pointer or index cooperating therewith.

As is most clearly illustrated in FIG. 1 the measuring apparatus comprises two shanks or handles 1a, 1b, which are pivoted to each other at one end for movement, as is indicated by the double arrow 5. The rotational or pivot axis is designated 2. The pivot is enclosed in a shell 3 which has a recess 4, the purpose of which will become apparent from the following. According to the invention the two shanks 1 form together a lever.

A substantially U-shaped or — as in the embodiment described — Z-shaped hook, which is generally designated 6, is maintained in its illustrated, inoperative position by friction, a spring clamp (not shown) or the like, and can be swung out to the position shown in FIG. 3 round its one bent end 7, which defines a pivot axis for the lever 1 when this is utilized according to FIG. 3. The other end 9 of the hook, which is bent substantially in an angle of 90°, is adapted to be hooked round the longitudinal edge of a ski 10, as is shown in FIG. 3.

To the upper side of the shank 1a there is secured a substantially plane scale plate 12, which is located in a plane which is substantially perpendicular to the pivot axis 2 and extends beyond the shank 1b and the scales of which are shown only in FIG. 4. These scales are made according to the recommendation of IAS (International Association for Safety in Skiing). As is apparent from FIG. 4, the scales are divided into two groups, i.e. one (B) for children and one (V) for adults. The first, arcuated scale $S_B$, $S_v$ defines the measure of the shin-bone head in centimeters, the next scale defines the appropriate release force $U_T$ in kilograms, and the rightmost scale defines the above-mentioned force $U_H$, also in kilograms.

To the shank 1b there are secured two pointers or indices 13V, 13B, which cooperate with the scale portions $S_v$ and $S_B$ and which move along these scale portions when the shanks 1a, 1b are rotated in relation to each other. For any value of $S_B$ and $S_v$ read, it is thus possible to determine the corresponding value of $U_T$ and $U_H$ according to the IAS standard.

As is apparent from FIGS. 1 and 2 the shanks 1a, 1b are each provided with a support or projection 14a, 14b, which project substantially perpendicularly from the respective arm or shank. These supports define a pivot axis for the lever 1 in the case of utilization according to FIG. 2. The pivot arms of the lever, which are designated k and l, respectively in FIG. 2 suitably have a length ratio of 1:5; 1:4 or 1:3 in relation to each other. To make this pivot arm relationship change as little as possible when the lever 1 is rotated, the surfaces of the supports 14 which face away from the lever are suitably shaped as portions of the circumferential surface of a circular cylinder having substantially the same radius r as the length of the supports.

Said pivot arm relationship is equal to the ratio between the distance of the pivot axis of the hook 6 to on the one hand the pivot axis 2 of the shanks and on the other hand the free end of the lever 1.

The free ends of the shanks 1a, 1b are provided with fastenings for a wire, a thin steel band or the like 17 (FIG. 1), which is adapted to be inserted under the heel or toe portion of the boot 15 for lifting the boot when determining $U_H$ or the corresponding release force for the toe. The wire or the like 17 is suitably detachable from at least one of the shanks 1a, 1b, among other things for permitting measuring of the shin-bone head by means of the apparatus according to the invention.

To this end the free ends of the shanks are provided with opposing abutments or measuring shoulders 18a, 18b which are pressed (FIG. 5) against the upper portion of the leg 20 below the knee according to the arrows for measurement of the lateral dimension of the shin-bone head 21, which dimension is read on the scale $S_B$ or $S_v$.

The force measuring means associated with the apparatus according to the invention and generally designated 22 and shown in FIG. 1 and 2 is basically a spring weighing scale and comprises a head 23 which is suitably provided with a rubber coating or the like, a piston cylinder 24, in which a compression spring means (not shown) is located, and an associated, extended piston 25 cooperating therewith. This piston may possibly be provided with a circumferential ring, which is axially displaceable by the cylinder when the piston is pressed in into the cylinder and then remains on the piston and thereby indicates how far the piston has been pressed in. The piston also is provided with at least one scale (not shown) which is graduated in kilograms and another scale (not shown) cooperating therewith and indicating said kilogram value multiplied with the inverted value of the above-mentioned lever arm ratio, i.e. the required release force U.

When the apparatus according to the invention shall be utilized for determining $U_H$ according to FIG. 2, the apparatus is applied as shown in this Figure with the wire or band 17 located under the heel portion of the boot 15 and with the free end of the piston rod 25 introduced in the recess 4 and with the free ends of the projections 14 engaging the ski 10. After that, the pivot end of the lever 1 is manually pressed down by the measuring means 22 in the direction of the arrow 19 and the force required for releasing the binding (or the fraction k/l thereof) is read on the scale of the force measuring means 22.

When the apparatus according to the invention is utilized for determining $U_T$ according to FIG. 3, the apparatus is applied as shown in this Figure with the force measuring means 22 clasped between the toe portion of the ski boot 15 and the cover or shell 3 (this may possibly be made rotatable on an axis coinciding with the longitudinal direction of the lever 1), after which the measuring apparatus is manually swung in the direction of the arrow 26 and the force required for releasing the binding (or the fraction k/l thereof) is read on the scale of the force measuring means 22.

One proceeds in the corresponding way when measuring the release force for the lifting of the toe and the twisting out of the heel laterally in respect of fully automatical safety ski bindings.

The embodiments described above and shown in the drawings are of course to be regarded merely as non-limiting examples and may as to their details be modified in several ways within the scope of the following claims. Thus, the shanks 1 may for example be prolonged rightwards to the right of the axis 2 and the hook 6 be linked to this prolonged portion, so that the lever 1 basically becomes one-armed. In the same way the lever 1 may be forked and provided with two rigid shanks with such a prolonged portion. Furthermore the measuring means 22 may be connected to the shell 3 and the shell be rotatable on an axis coinciding with the longitudinal direction of the lever 1. In addition hereto, the point of application of the measuring means 22 on the lever 1 does not have to be a recess in the shell 3 but may be shaped in another suitable way for guiding contact between the shell 3 and the measuring means 22. It is also not necessary that the pivot axis 2 coincides with the point of application of the measuring means 22 on the lever 1.

In bindings, where the boot is fastened on a plate which in its turn is clamped in a release device, the wire may be placed under the plate, under the heel or under the toe.

What I claim is:

1. Apparatus for measuring the force required to release the heel and toe pieces of a safety ski binding releasably holding a ski boot on a ski, said apparatus comprising:

a force measuring tool;
a lever comprising two pivotally interconnected shanks extending from a common pivot point on said lever and having spaced apart free ends, said lever further including means connectable to said force measuring tool, and a depending projection on said lever located closer to said free shank ends than to said last-mentioned means for permitting pivotal movement of said lever about said projection in a vertical plane;
lifting means connectable to said free ends of said shank to extend therebetween beneath the heel portion of the ski boot for applying an upward force on the boot heel when a downward force is applied through said force measuring tool to said means connectable to said force measuring tool, whereby to measure the upward force required to release the boot heel from the heel piece of the binding;
a second lever pivotally mounted on one of the shanks of said first-mentioned lever for movement between a first position in alignment with said one shank and a second position extending outward from said one shank, means for connecting said second lever to the ski when in its second position to permit pivotal movement of said first-mentioned lever about the pivot between said first-mentioned and second levers, said last-mentioned pivot being located closer to said means connectable to said force measuring tool than to said free shank ends, whereby when said force measuring means is disposed between said connectable means and the toe of said boot and a force is applied to said one shank end in a direction away from said ski, said force measuring tool will apply a measurable force to the toe of said boot in the opposite direction.

2. Measuring apparatus according to claim 1, in which the axis of said last-mentioned pivot is substantially perpendicular to the pivotal axis defined by said depending projection.

3. Measuring apparatus according to claim 1, in which said lifting means is permanently attached to one shank and releasably fastened to the other shank.

4. Measuring apparatus according to claim 1, wherein the free ends of the shanks comprise a pair of opposing projections for engaging the opposite sides of a part of the human body to define the transverse dimension thereof, and further comprising indicia means cooperatively associated with said shanks for correlating said dimension with the maximum force necessary for releasing said fastening means of a ski binding of the safety type from a ski boot fastened in said ski binding.

5. Measuring apparatus according to claim 4, wherein said indicia means is a scale having numerical values of said dimension of the human body and for each such value the corresponding maximum force, said scale being secured to one of said shanks, and index means provided on the other shank for cooperation with the representations on the scale of the dimension of the body.

6. Measuring apparatus according to claim 1, further comprising a second dependent projection, each of said projections being secured to and projecting from a different one of said shanks and being adapted to be applied against the upper surface of a ski, said projections defining the pivot axis on which said first-mentioned lever is pivotable when releasing the heel portion of a ski boot by lifting said heel portion out of said heel piece of the binding.

7. Measuring apparatus according to claim 6, wherein the faces of said projections facing away from their respective shanks constitute portions of a single cylindrical circumferential surface, the axis of which is substantially perpendicular to the longitudinal direction of said first-mentioned lever and extends substantially in the same plane as said shanks.

8. Apparatus for measuring the force required to release the heel and toe pieces of a safety ski binding releasably holding a ski boot on a ski, said apparatus comprising:
 a force measuring tool;
 a lever comprising two pivotally interconnected shanks extending from a common pivot point on said lever and having spaced apart free ends, said lever further including means connectable to said force measuring tool, and a depending projection on said lever located closer to said free shank ends than to said last-mentioned means for permitting pivotal movement of said lever about said projection in a vertical plane;
 lifting means connectable to said free ends of said shank to extend therebetween beneath the heel portion of the ski boot for applying an upward force on the boot heel when a downward force is applied through said force measuring tool to said means connectable to said force measuring tool, whereby to measure the upward force required to release the boot heel from the heel piece of the binding; the free ends of said shanks comprising a pair of opposing projections for engaging the opposite sides of a part of the human body to define the transverse dimension thereof, and further comprising indicia means cooperatively associated with said shanks for correlating said dimension with the maximum force necessary for releasing said fastening means of a ski binding of the safety type from a ski boot fastened in said ski binding.

9. Measuring apparatus according to claim 8, in which said lifting means is permanently attached to one shank and releasably fastened to the other shank.

10. Measuring apparatus according to claim 8, wherein said indicia means is a scale having numerical values of said dimension of the human body and for each such value the corresponding maximum force, said scale being secured to one of said shanks, and index means provided on the other shank for cooperation with the representations on the scale of the dimension of the body.

11. Measuring apparatus according to claim 8, further comprising a second depending projection, each of said depending projections being secured to and projecting from a different one of said shanks and being adapted to be applied against the upper surface of a ski, said depending projections defining the pivot axis on which said lever is pivotable when releasing the heel portion of a ski boot by lifting said heel portion out of said heel piece of the binders.

* * * * *